US 11,713,588 B2

(12) United States Patent
Vith Hansen

(10) Patent No.: US 11,713,588 B2
(45) Date of Patent: Aug. 1, 2023

(54) FENCE SYSTEM

(71) Applicant: Handels- og Produktionsselskabet Ven-Po A/S, Hjerm (DK)

(72) Inventor: Flemming Vith Hansen, Holstebro (DK)

(73) Assignee: Handels—og Produktionsselskabet Ven-Po A/S, Hjerm (DK)

( * ) Notice: Subject to any disclaimer, the term of this patent is extended or adjusted under 35 U.S.C. 154(b) by 265 days.

(21) Appl. No.: 17/136,111

(22) Filed: Dec. 29, 2020

(65) Prior Publication Data

US 2021/0131139 A1 May 6, 2021

Related U.S. Application Data

(63) Continuation of application No. PCT/DK2019/050080, filed on Mar. 6, 2019.

(30) Foreign Application Priority Data

Jul. 4, 2018 (DK) .............................. PA 2018 00333

(51) Int. Cl.
*E04H 17/06* (2006.01)
*E04H 17/12* (2006.01)
(52) U.S. Cl.
CPC .............. *E04H 17/06* (2013.01); *E04H 17/12* (2013.01)
(58) Field of Classification Search
CPC ...... A01K 3/005; E04H 17/017; E04H 17/02; E04H 17/04; E04H 17/06; E04H 17/10; E04H 17/12; E04H 17/124; E04H 17/261
See application file for complete search history.

(56) References Cited

U.S. PATENT DOCUMENTS

| 2,053,195 | A | | 9/1936 | Jernegan |
|---|---|---|---|---|
| 3,022,044 | A | | 2/1962 | Samuel |
| 3,749,820 | A | | 7/1973 | Langlie et al. |
| 3,902,817 | A | * | 9/1975 | Meir ......................... F16B 7/20 403/349 |
| 4,632,221 | A | | 12/1986 | Stanford |
| 4,717,123 | A | | 1/1988 | Wrigley |
| 4,848,027 | A | * | 7/1989 | Skierwiderski ........ A01G 17/14 47/42 |
| 8,495,801 | B2 | * | 7/2013 | Wang ....................... F16B 2/10 24/280 |
| 9,512,714 | B2 | * | 12/2016 | Sobolewski ........ F16L 55/0336 |
| 10,710,357 | B2 | * | 7/2020 | Melvin .................. B33Y 50/02 |
| 2013/0068503 | A1 | | 3/2013 | Walker, Jr. |

(Continued)

FOREIGN PATENT DOCUMENTS

| CA | 2361027 A1 * | 5/2003 | .............. E04G 7/14 |
|---|---|---|---|
| DE | 102016103895 A1 | 9/2017 | |

(Continued)

*Primary Examiner* — Jonathan P Masinick
(74) *Attorney, Agent, or Firm* — Elevated IP, LLC

(57) ABSTRACT

A fence system (30) for fixing a thread (8, 8', 8", 8''') to a post (4) is disclosed. The fence system (30) comprises a fixation member (2, 2') comprising one or more fixation structures (6, 6', 6", 6''') configured to receive the thread (8, 8', 8", 8''') and hereby fix the thread (8, 8', 8", 8''') to the fixation member (2, 2'). The fixation member (2, 2') comprises a first portion (12) and a second portion (12') detachably attached to each other.

14 Claims, 15 Drawing Sheets

(56) References Cited

U.S. PATENT DOCUMENTS

2014/0318828 A1 10/2014 Nelson
2015/0337558 A1 11/2015 Shepherd

FOREIGN PATENT DOCUMENTS

| EP | 0428468 | A1 | | 5/1991 | | |
|----|---------|----|---|--------|---|---|
| EP | 2194216 | A1 | | 6/2010 | | |
| EP | 2998461 | A1 | * | 3/2016 | ............. | E04H 17/10 |
| FR | 1053659 | A | | 2/1954 | | |
| GB | 423146 | A | | 1/1935 | | |
| JP | 3175300 | U | | 5/2012 | | |
| KR | 101477753 | B1 | | 12/2014 | | |

* cited by examiner

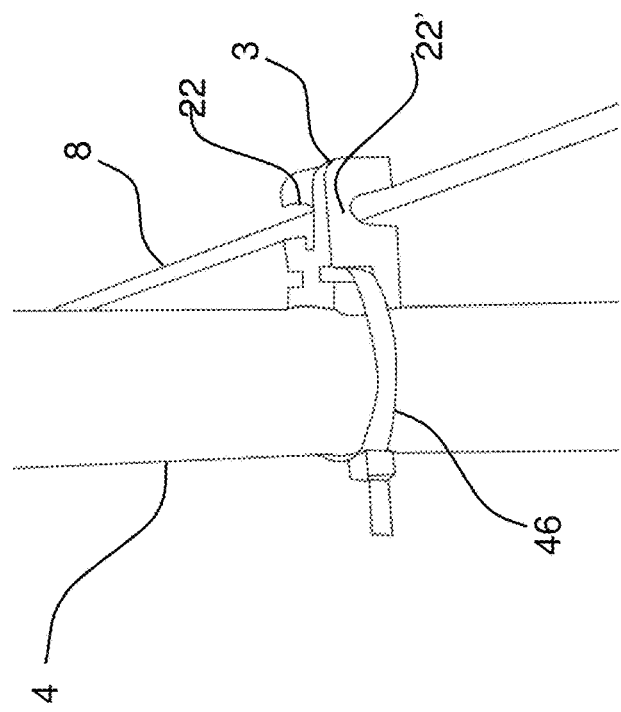
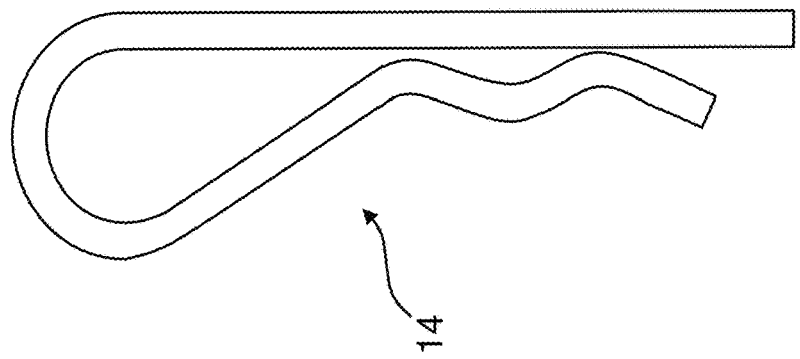
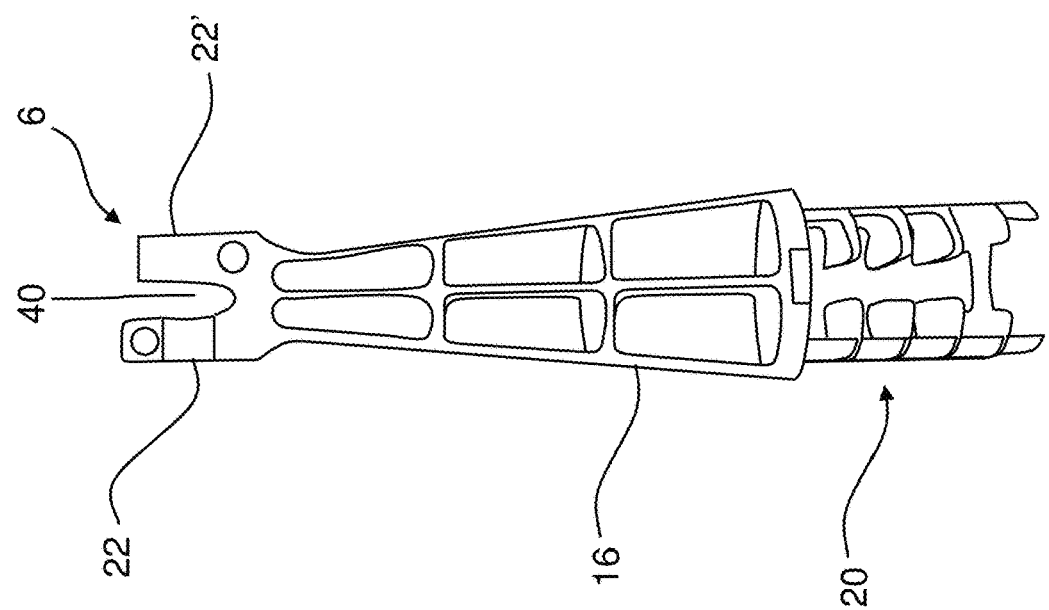
Fig. 4B
Fig. 4C
Fig. 4A

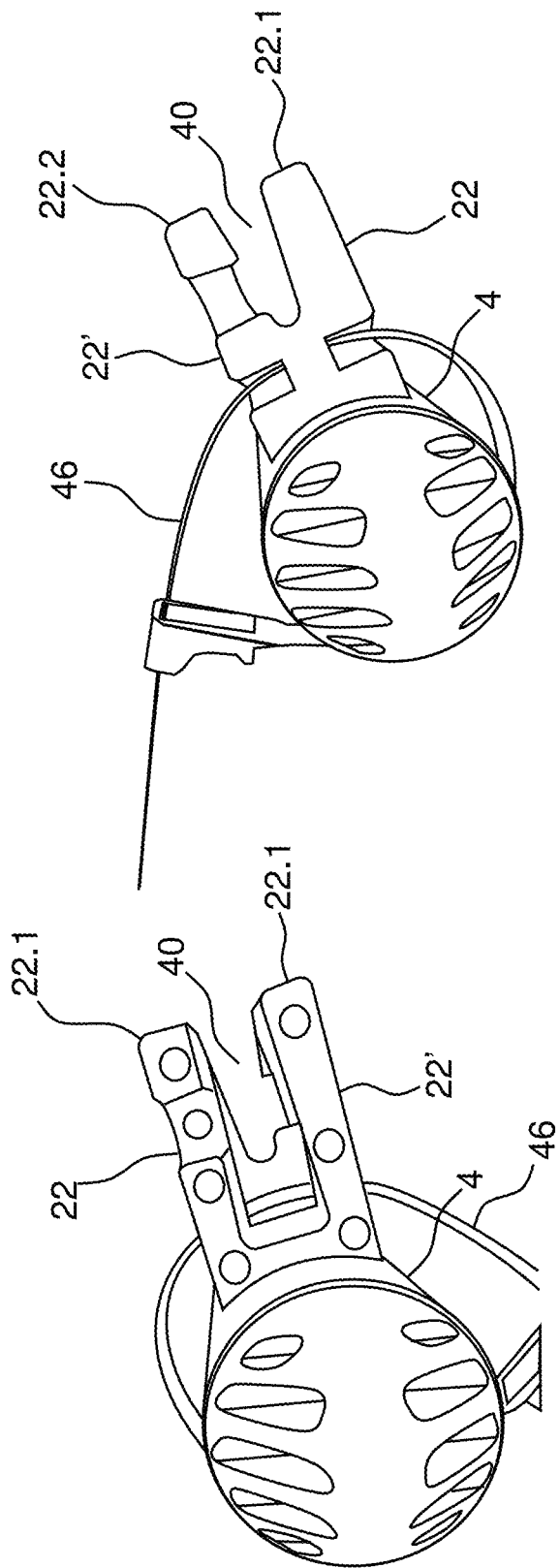

FENCE SYSTEM

CROSS-REFERENCE TO RELATED APPLICATIONS

This application is a continuation under 35 U.S.C. 111 of International Patent Application No. PCT/DK2019/050080, filed Mar. 6, 2019, which claims the benefit of and priority to Danish Application No. PA 2018 00333, filed Jul. 4, 2018, each of which is hereby incorporated by reference in its entirety.

FIELD OF INVENTION

The present invention relates to a fence system for fixing a thread to a post. The invention can be applied in electrified wire fencing by way of example. The invention can also be applied for fixing a wire mesh to a post.

BACKGROUND

Electrified wire fencing is widely used for farming (e.g. cattle farming, sheep farming and horse farming). Electrified wire fencing is an incomplete electrical circuit. The electric fence charger sends pulses of electrons down the electric fence threads or wires, but insulators prevent the electric charge from reaching the ground. Accordingly, the electric fence circuit is only completed when an object (e.g. a cattle, humans, or vegetation) touches the wire/thread allowing the pulse of electrons in the high tensile wire to travel through the body down into the soil.

A prior art fence system typically comprises a number of ground mounted posts or poles and one or more electrically insulating fixing structures adapted for being attached to the post and for receiving a wire/thread. One drawback associated with the prior art is that the process of mounting the insulating fixing structures to the post is very time consuming.

Some fence systems comprise insulating fixing structures that are permanently fixed to the post by means of screws or nails. These are difficult to use, if the vertical position of the thread/wire has to be changed. Accordingly, fence systems comprising vertically adjustable insulating fixing structures have been developed. These fence systems, however, suffer from the drawback that when an additional insulating fixing structure has to be mounted to a post, it requires that the insulating fixing structures already fixed to the post are moved or even removed. Therefore, it would be desirable to be able to provide a fence system, in which additional insulating fixing structures can be mounted to a post without moving or removing any insulating fixing structures already fixed to the post.

SUMMARY

It is an object of the present invention to provide a fence system, in which additional insulating fixing structures can be mounted to a post without moving or removing any insulating fixing structures already fixed to the post.

It is also an object of the invention to provide a fence system suitable for fixing a wire mesh to a post in a fast and user-friendly manner.

The fence system disclosed herein is a fence system for releasably mounting a thread to a post, wherein said fence system comprises a fixation member comprising one or more fixation structures configured to receive the thread and hereby fix the thread to the fixation member, wherein the fixation member comprises a first portion and a second portion detachably attached to each other. The fixation member comprises a basically cylindrical pole contact surface which spans at least 180 degrees from a first to a second end thereof and both the first and second portions comprise a pivot joint at diametrically opposed ends with a pivotal axis arranged in parallel to a length axis of the cylindrical geometry of the pole contact surface. Hereby, the fixation member can be disassembled and thus it is easy to attach the fixation member to a post. Accordingly, the invention makes it possible to provide a fence system, in which additional insulating fixing structures can be mounted to a post without moving or removing any insulating fixing structures already fixed to the post. Furthermore, a fast detachment of the fixation member is possible. Besides, it is possible to mount a wire mesh using the fixation member.

The fence system is suited for fixing a thread to a post. By the term thread should be understood any structure suitable for being used in an electrical fence system. Thus, the thread may be a wire, a string or a conductor. The thread/wire may also include a thread/wire from a wire mesh.

The post or pole may be a tubular structure or a massive structure. The post may have a circular cross-sectional area. The post may have a triangular cross section. The post may have a rectangular (e.g. a square) cross-section. The post may have a polygonal cross-section (e.g. a pentagonal, hexagonal or octagonal cross-section).

It may be an advantage that the fixation member comprises one or more rotatably mounted fastening screws arranged to be radially displaced upon being rotated. Hereby, the fastening screws can be used to attach the fixation member to the post.

In an embodiment at the first portion and at the second portion the fixation screw is arranged at a midpoint between two fixation structures. This ensures that fixation screws are placed correctly and that the forces at the fixation structures from the thread are transferred to the pole.

In an embodiment, at least one of the one or more fastening screws is a thumb screw. The use of a thumb screw may reduce the attachment time and allow the fencing system to be assembled and disassembled without using tools. Hereby, a fast and user-friendly attachment to a post can be achieved, where the user is not in need of any tool whatsoever, apart from his hands in order to mount the fixation structure to a post.

In an embodiment the first portion and the second portion comprise a through-going bore (a hole) and a pin member (preferably a spring pin) configured to be inserted through the through-going bores, wherein the through-going bores and the pin member constitute a rotary joint (also called a pivot joint).

It may be advantageous that the first portion and the second portion are identical. Hereby, the production cost can be minimized as only one injection mold need to be provided in order to manufacture a set comprising first and second portions. Also, the logistics of the system become simplified, when only one piece is needed.

In an embodiment, the first portion and the second portion are identical structures and made by injection molding. In an embodiment the first portion and the second portion are made of plastic during an injection molding manufacturing process.

It may be beneficial that the first portion comprises a first receiving structure configured to receive a corresponding protruding structure of the second portion and vice versa.

It may be an advantage that the fixation member comprises two, three or four attachment arms. Hereby, the fixation member can be used to guide a thread/wire in a manner in which a first portion of the thread/wire protrudes from the fixation member in a first direction and in which a second portion of the thread/wire protrudes from the fixation member in another (different) second direction. Accordingly, the fixation member may be used to provide a corner section of the thread/wire.

It may be advantageous that the attachment arms are evenly distributed along the periphery of the fixation member. This means that the angle between any set of adjacent attachment arms is basically the same.

Hereby, the fixation can be used to provide a predefined path for the thread around a post such as a 90-degree bend or a 180-degree bend of the thread around a post.

It may be an advantage that the fixation member extends along a circular cylindrical surface which will form the pole contact surface when the fixation member is attached to a circular cylindrical pole. Hereby, it is possible to provide a reliable fixation of the fixation member to a cylindrical post.

It may be advantageous that the fence system comprises a top member configured to be attached to the top portion of a pipe-shaped post, wherein said top member comprises a fixation structure. Hereby, the top member can constitute an end piece that provides a nice finish. At the same time, the top member can be used to fix a top thread/wire of the fence system.

In an embodiment, a nut corresponding to the screw is provided in a nut recess at first, second and counter portions whereby the first, second and counter portions are axially limited by two parallel opposed planes, which are both arranged perpendicular to the length axis of the cylindrical pole contact face and further, the nut recess is open in the axial direction towards the one plane for insertion of the nut, and that a screw recess is provided axially opposite the nut recess and is open towards the opposed plane. In this way a radial screw opening is provided in the first, second and counter portions, such that these portions may be manufactured without complex mold parts. The counter portion is identical to the first and second portions but has no fixation structures attached thereto.

In an embodiment the fixation structures are arranged at the outer cylindrical surface of the first and second portion. In this way it may be ensured that the cooling time during manufacture is not excessive while high strength of the parts is ensured.

It may be beneficial that the fence system comprises a number of posts and a number of threads/wires. In a preferred embodiment, the fence system comprises a plurality of posts and one or more threads/wires.

It may be advantageous that the fence system comprises one or more additional fixation elements configured to be attached to the post, wherein said additional fixation elements are configured to receive and maintain an additional post.

Hereby, the additional fixation elements can be used to mount a horizontally arranged additional post.

It may be an advantage that the first portion and/or the second portion is provided with one or more indentations extending along the inside surface of the first portion and/or the second portion, respectively, wherein said indentations are configured to receive a thread/wire. Hereby, the fixation member may be used to fix a wire mesh to a post.

In an embodiment, a plurality of indentations is provided along the inside surface of the first portion and/or the second portion, respectively. It may be an advantage that the fixation member comprises four indentations, preferably two indentations provided in the first portion and two indentations provided in the second portion.

In an embodiment, each of the one or more additional fixation elements comprises a receiving structure arranged and configured to receive a post (e.g. a vertically extending ground mounted post). It may be an advantage that the receiving structure of the one or more additional fixation elements comprises a first counter portion and a second counter portion detachably attached to each other.

Hereby, it is possible to provide a fast and user-friendly attachment of the one or more additional fixation elements to a post.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 4A shows a side view of a top member according to the invention;

FIG. 4B shows a perspective side view of a fixation structure according to the invention;

FIG. 4C shows a side view of a spring pin according to the invention;

FIG. 7A is a view of the fixture structure 3 with a pole seen from above,

FIG. 7B is a view as in FIG. 7A, but with the fixture structure turned over to show its underside.

DETAILED DESCRIPTION

Figure 1A:
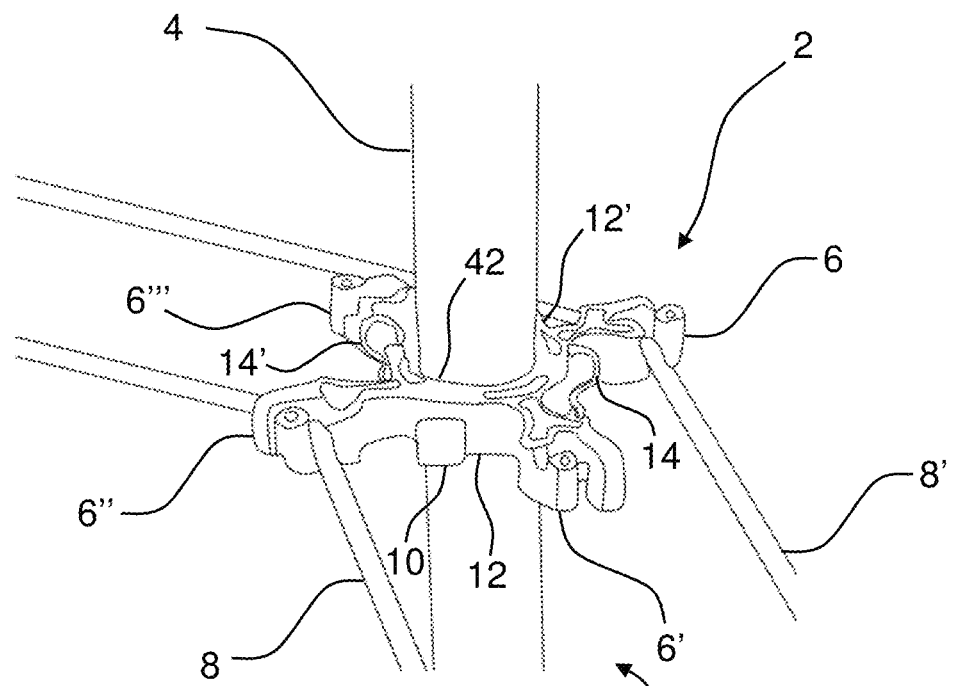
FIG. 1A shows a perspective view of a fixation member according to the invention detachably attached to a post.

Referring now in detail to the drawings for the purpose of illustrating embodiments of the present invention, a fixation member 2 of the present invention is illustrated in FIG. 1A.

FIG. 1A illustrates a perspective view of a fence system 30 according to the invention. The fence system 30 comprises a post 4 and a fixation member 2 according to the invention being detachably attached to a post 4. The word "pole" is also used for the structure to which the fixation member 2 is to be fixed. The fixation member 2 comprises a first portion 12 and a second portion 12' detachably attached to the first portion 12 by means of a first spring pin 14 and a second spring pin 14'.

Each of the spring pins 14, 14' constitute part of a pivot joint 13. Accordingly, when one of the spring pins 14, 14' has been removed, the remaining spring pin 14, 14' will function as a shaft about which the first portion 12 and the second portion 12' are rotatably attached to each other.

The fixation member 2 comprises four attachment arms 6, 6', 6", 6'" that are evenly distributed along the periphery of the fixation member 2 and are protruding radially from the base structure 42 of the fixation member 2. This means that there is 90 degrees between any adjacent attachment arms 6, 6', 6", 6'".

The first portion 12 comprises two attachment arms 6, 6', and the second portion 12' comprises two attachment arms 6", 6'". Each attachment arm 6, 6', 6", 6'" comprises a first U-shaped support structure 22 and a second U-shaped support structure 22'. A gap is provided between the U-shaped support structures 22, 22'. The first U-shaped support structure 22 is arranged to support a thread/wire 8 received by the first U-shaped support structure 22 in a downward direction, wherein the second U-shaped support structure 22' is arranged to support a thread/wire 8 received by the second U-shaped support structure 22 in an upward direction.

Accordingly, the support structures 22, 22' are arranged and configured to fix threads/wires 8 to the fixation member 2. A first thread/wire 8 is attached to one of the attachment arms 6", and a second thread/wire 8' is attached to another attachment arm 6.

A thumb screw 10 is rotatably attached to the base structure 42 of the fixation member 2. Accordingly, the thumb screw 10 is arranged and configured to fix the fixation member 2 to the post 4. When the thumb screw 10 is rotated, the thumb screw 10 will be moved towards or away from the post depending on the direction of rotation. Thus, the thumb screw 10 can be used to ensure that the fixation member 2 is maintained in a desired vertical position on the post 4.

Figure 1B:
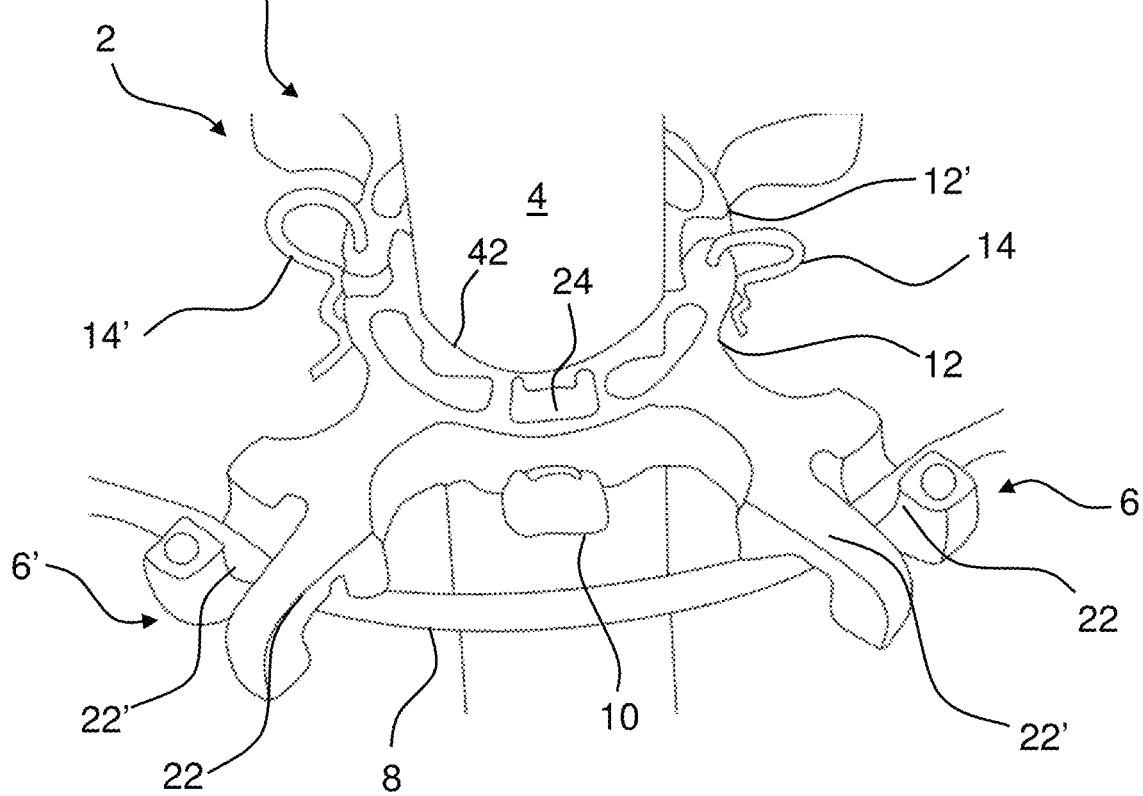
FIG. 1B shows a perspective, close-up view of a fixation member according to the invention detachably attached to a post.

FIG. 1B illustrates a perspective, close-up view of a fence system 30 according to the invention. The fence system 30 comprises a post 4 and a fixation member 2 detachably attached to the post 4. The fixation member 2 comprises a base structure 42 having a centrally arranged basically cylindrical opening. The opening is adapted to abut a cylindrical post 4.

The fixation member 2 comprises a first portion 12 and a second portion 12' being detachably attached to the first portion 12 by means of a first spring pin 14 and a second spring pin 14'. The spring pins 14, 14' extend through through-going openings (holes) provided in the first portion 12 and the second portion 12', respectively. When the spring pins 14, 14' are removed, the first portion 12 can be removed from the second portion 12'.

A thumb screw/wing screw 10 is rotatably attached to a nut 24 received by a receiving structure in the base structure 42. The base structure 42 is made of an electrically insulating material (e.g. a plastic material) and thus, the nut 24 can be electrically insulated from the post 4. The thumb screw/wing screw 10 is preferably provided with a wing portion made in an electrically non-conducting material (e.g. plastic).

The fixation member 2 comprises attachment arms 6, 6' corresponding to the ones shown in FIG. 1A. A thread/wire 8 is attached to the attachment arms 6, 6'.

Figure 2A:
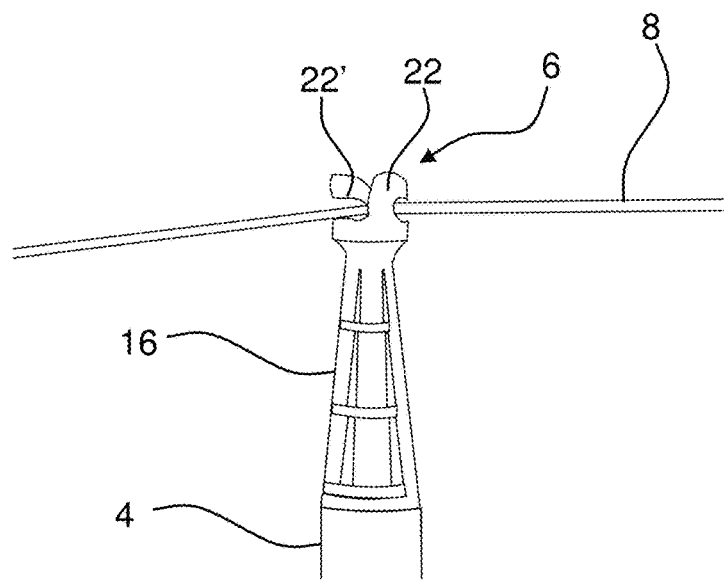
FIG. 2A shows a top member according to the invention.

FIG. 2A illustrates a top member 16 according to the invention. The top member 16 is attached to the top structure (end portion) of a post 4. The top member 16 comprises an attachment arm 6 arranged in the top portion of the top member 16. The attachment arm 6 comprises a first U-shaped support structure 22 and a second U-shaped support structure 22'. A gap 40 is provided between the U-shaped support structures 22, 22'. A thread/wire 8 is attached to the support structures 22, 22' of the attachment arm 6 of the top member 16.

Figure 2B:
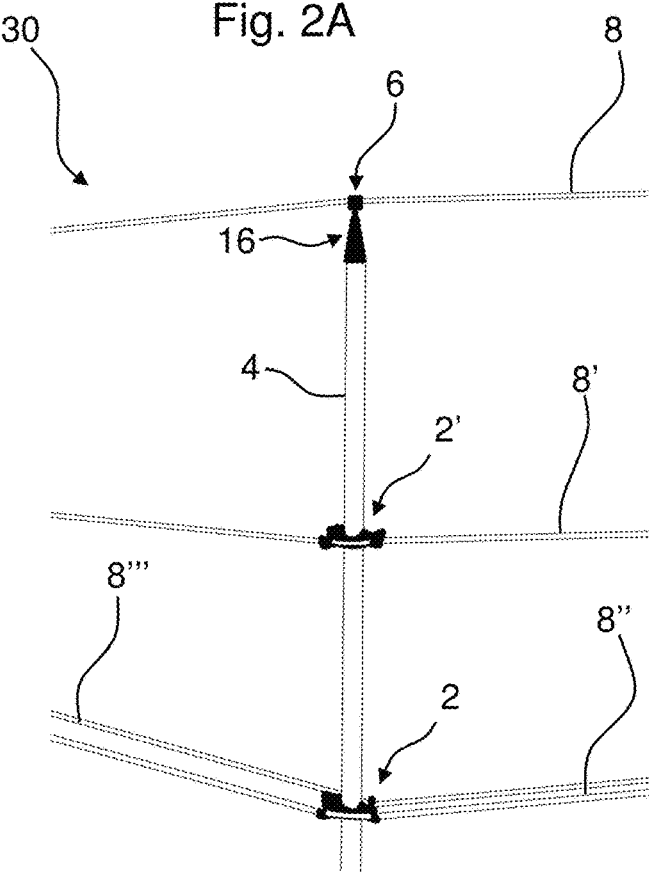
FIG. 2B shows a fence system according to the invention comprising a top member and two fixation members according to the invention attached to a post.

FIG. 2B illustrates a fence system 30 according to the invention comprising a top member 16 corresponding to the one shown in FIG. 2A and two fixation members 2, 2' according to the invention attached to a post 4. The fixation members 2, 2' may be of the type shown in FIG. 1A and FIG. 1B.

The top member 16 comprises an attachment arm 6 that is used for fixation of a thread/wire 8. The first fixation member 2 is attached to the post 4 at a lower position than the top member 16 and the second fixation member 2'. The first fixation member 2 is used for fixation of two threads/wires 8", 8'". The second fixation member 2' is attached to the post 4 in a vertical position between the top member 16 and the first and lowest positioned fixation member 2. The second fixation member 2' is used for fixation of a single thread/wire 8'.

Figure 3A:
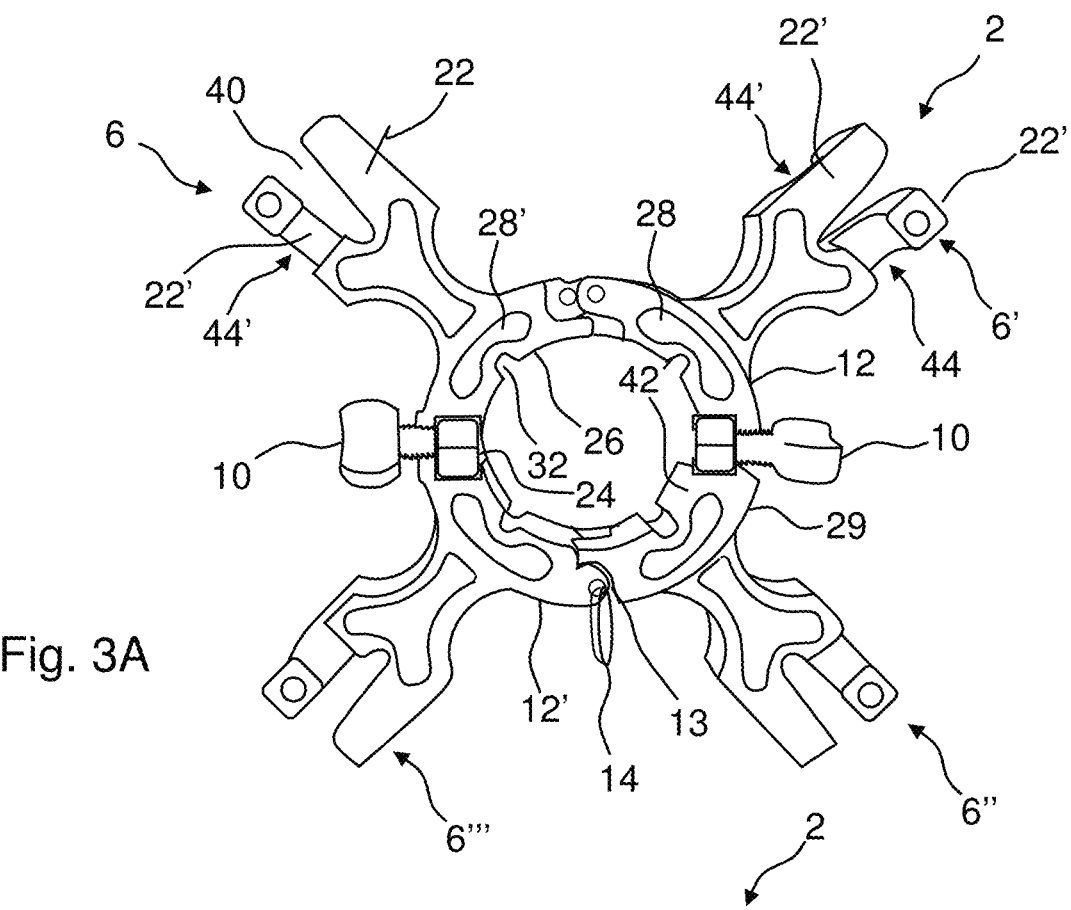
FIG. 3A shows a top view of a fixation member according to the invention in a closed configuration.
Figure 3B:
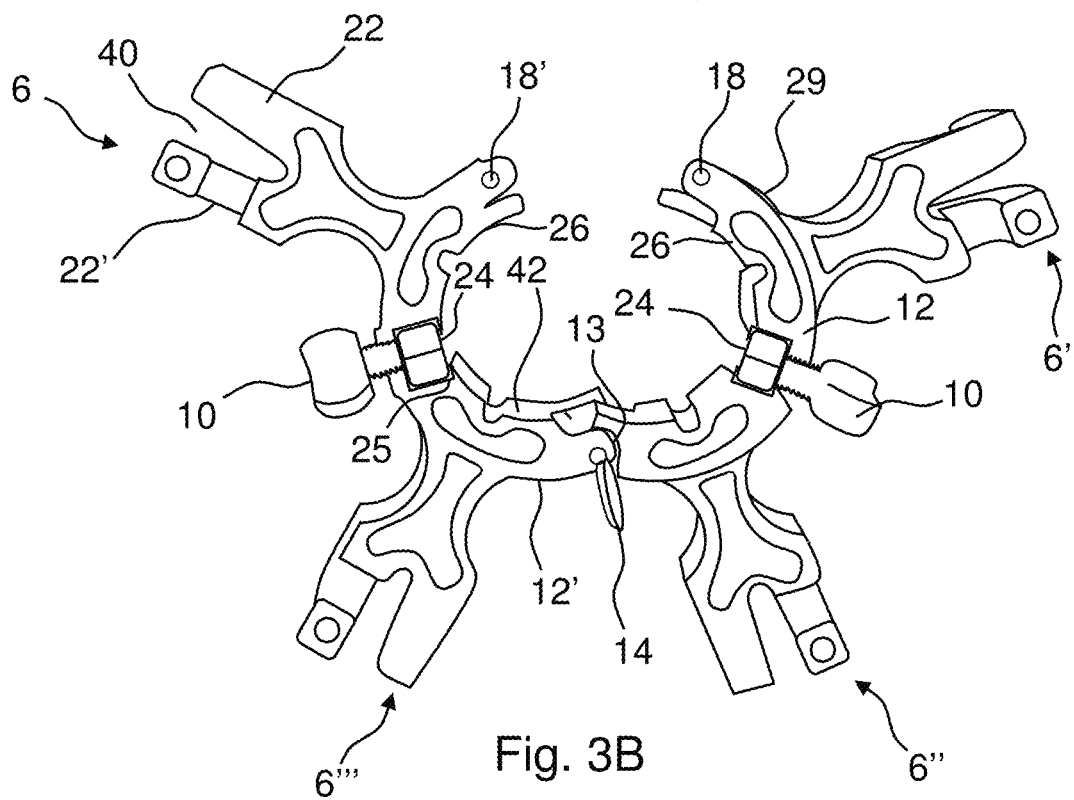
FIG. 3B shows a top view of the fixation member shown in FIG. 3A in an open configuration.

FIG. 3A illustrates a top view of a fixation member 2 according to the invention in a closed configuration. FIG. 3B illustrates a top view of the fixation member shown in FIG. 3A in an open configuration. The fixation member 2 comprises a first portion 12 and a second portion 12' detachably attached to the first portion 12 by means of a first spring pin 14.

The spring pin 14 constitutes a part of a pivot joint 13. The pivot joint 13 allows the first portion 12 to be rotated relative to the second portion 12'. Accordingly, the first portion 12 and a second portion 12' are rotatably attached to each other. Thus, the fixation member 2 can be brought from the closed configuration shown in FIG. 3A to the open configuration shown in FIG. 3B simply by rotating one of the portions 12, 12' relative to the other one.

The fixation member 2 comprises four attachment arms 6, 6', 6", 6'" that are evenly distributed along the periphery of the fixation member 2 and are protruding radially from the base structure 42 of the fixation member 2. Accordingly, the angle between adjacent attachment arms 6, 6', 6", 6'" is 90 degrees.

The first portion 12 comprises two attachment arms 6, 6' and the second portion 12' comprises two attachment arms 6", 6'". Each attachment arm 6, 6', 6", 6'" comprises a first support structure 22 comprising a receiving slot 44 and a second support structure 22' comprising a receiving slot 44'. A gap 40 is provided between the support structures 22, 22'. It may be an advantage that the support structures 22, 22' are U-shaped. The support structures 22, 22' are arranged and configured to fix threads/wires to the fixation member 2.

Two thumb screws 10 are rotatably attached to the base structure 42 of the fixation member 2. The first portion 12 comprises one thumb screw 10 and the second portion 12 comprises one thumb screw 10. The thumb screws 10 comprise a head portion made of an electrically non-conducting material (preferably a plastic material). The head portion is attached to a threaded rod portion that is brought into engagement with a nut 24 fixed to the base structure 42 and having a corresponding inner threaded portion. Accordingly, the thumb screws 10 are arranged and configured to fix the fixation member 2 to a post extending through the centrally arranged opening of the fixation member 2. When the thumb screw 10 is rotated, the thumb screw 10 will be moved towards or away from the central portion of the fixation member 2 depending on the direction of rotation. Thus, the thumb screw 10 can be used to ensure that the fixation member 2 is maintained in a desired vertical position on a post.

With reference to FIGS. 1, 3, 6 and FIGS. 11-14, the first and second portions are described in more detail. The nut 24 corresponding to the thumb screw 10 is provided in a nut recess 25 at first and second portions 12,12' and also in counter portion 12". The first and second and counter portions 12, 12', 12" are axially limited by two parallel opposed planes, which are both arranged perpendicular to a length axis of the cylindrical pole contact face 26. The nut recess 25 is open in the axial direction towards the one plane for insertion of the nut 24, and a screw recess 11 is provided axially opposite the nut recess 25 and is open towards the opposed plane. The nut recess 25 and the screw recess 11 are made to extend from each of their limiting parallel planes, and overlap in an area which is equally distanced from the two limitation planes. In the overlap area, a through-going hole will be provided, which allows the threaded shaft of the thumb screw or another fastening member to extend from an outer to an inner side of the first, second and counter portions 12,12',12" respectively.

This construction allows the first, second and counter portions to be molded in rather simple molding tools, without specialized movable core parts, where the two mold parts forming the mold cavity have their parting plane provided at a midplane between the first and second limitation planes.

The fixation member 2 is easy and fast to attach to a post. Besides, it is possible to attach the fixation member 2 to a post even when one or more of the fixation members are already attached to the post. Openings 28, 28' are provided in the first portion 12 and the second portion 12'. These openings 28, 28' increase the flexibility of the first portion 12 and the second portion 12' so that fixation member 2 can easily be attached to a post 4. Furthermore, the use of openings 28, 28' makes it possible to produce the fixation member 2 with a lower quantity of material e.g. when the fixation member 2 is produced by using a plastic injection process. The openings 28 are also instrumental in ensuring a uniform wall thickness, which again will ensure that the cooling of the object in an injection molding tool is uniform, and this ensures higher strength of the molded piece.

In an embodiment, the first portion 12 and the second portion 12' are provided with indentations 32 extending along the inside surface of the first portion 12 and the second portion 12', respectively. The indentations 32 are configured to receive a thread/wire (e.g. a vertically extending thread/wire of a wire mesh as shown in FIG. 6). Accordingly, the fixation member 2 can be used both to fix a wire mesh to a post and to fix one or more additional threads/wires to the attachment arms 6, 6', 6", 6'" and thus to the post to which the fixation member 2 is attached.

FIG. 4A illustrates a side view of a top member 16 according to the invention. The top member 16 comprises a base portion 20 provided below a central portion. The base portion 20 is configured to be inserted into a hollow structure of a pipe-shaped post. The central portion has a tapered geometry and comprises reinforcement structures constituting a mesh structure. The top portion 16 comprises an attachment arm 6 comprising a first support structure 22 and a second support structure 22'. A gap 40 is provided between the support structures 22, 22'.

FIG. 4B illustrates a perspective side view of a fixation structure 3 according to the invention. The fixation structure 3 is attached to a post 4 by means of a band member (e.g. a cable tie) 46. The fixation structure 3 comprises a contact surface 48 configured to abut a cylindrical post 4. Accordingly, the contact surface 48 has a concave geometry that corresponds to the geometry of the post 4, whereby the concave surface 48 is configured as part of a cylindrical surface, which has a cylinder axis, which when mounted runs parallel with the cylinder axis of the pole.

A spring pin 14 is illustrated in FIG. 4C. This is a standardized assembly element and is produced in large quantities, and thus is readily available in most parts of the world and at a fair price.

Figure 5B:
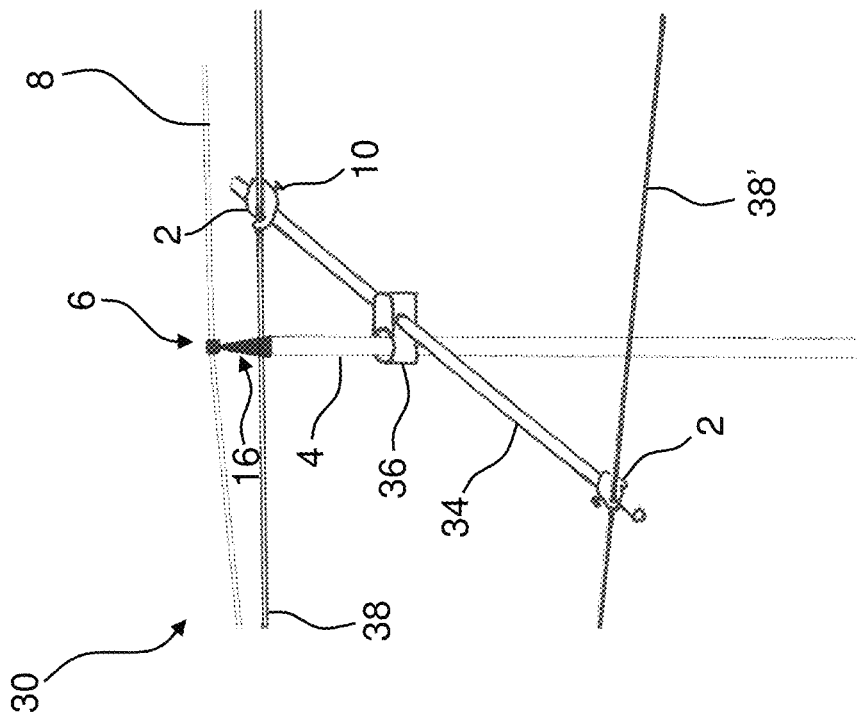
FIG. 5B shows another fence system according to the invention comprising a fixation element attached to a vertically extending ground-engaging post, wherein a horizontally extending additional post is attached to the fixation element.
Figure 5A:
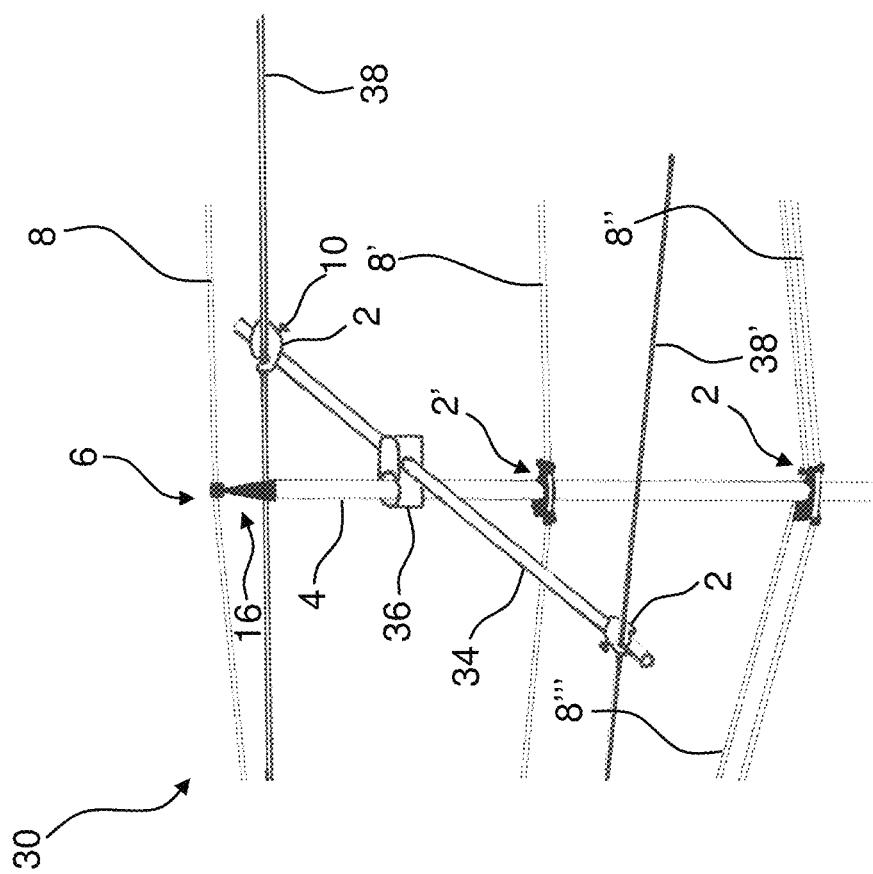
FIG. 5A shows a fence system according to the invention comprising a fixation element attached to a vertically extending ground-engaging post, wherein a horizontally extending additional post is attached to the fixation element.

FIG. 5A illustrates a fence system 30 according to the invention comprising a fixation element 36 attached to a vertically extending ground-engaging post 4, wherein a horizontally extending additional post 34 is attached to the fixation element 36. The fence system 30 corresponds to the one shown in FIG. 2B except for the fixation element 36, the horizontally extending additional post 34 and two fixation members 2 attached at the distal and proximal end of the additional post 34. These fixation members 2 are used to fix two threads/wires 38, 38'.

FIG. 5B illustrates another fence system 30 according to the invention comprising a fixation element 36 attached to a vertically extending ground-engaging post 4, wherein a horizontally extending additional post 34 is attached to the fixation element 36. The fence system 30 basically corresponds to the one shown in FIG. 5A. However, the fence system 30 does not comprise the two lowermost positioned fixation members 2, 2' and the threads/wires 8', 8", 8'" fixed thereto as shown in FIG. 5A.

Figure 6B:
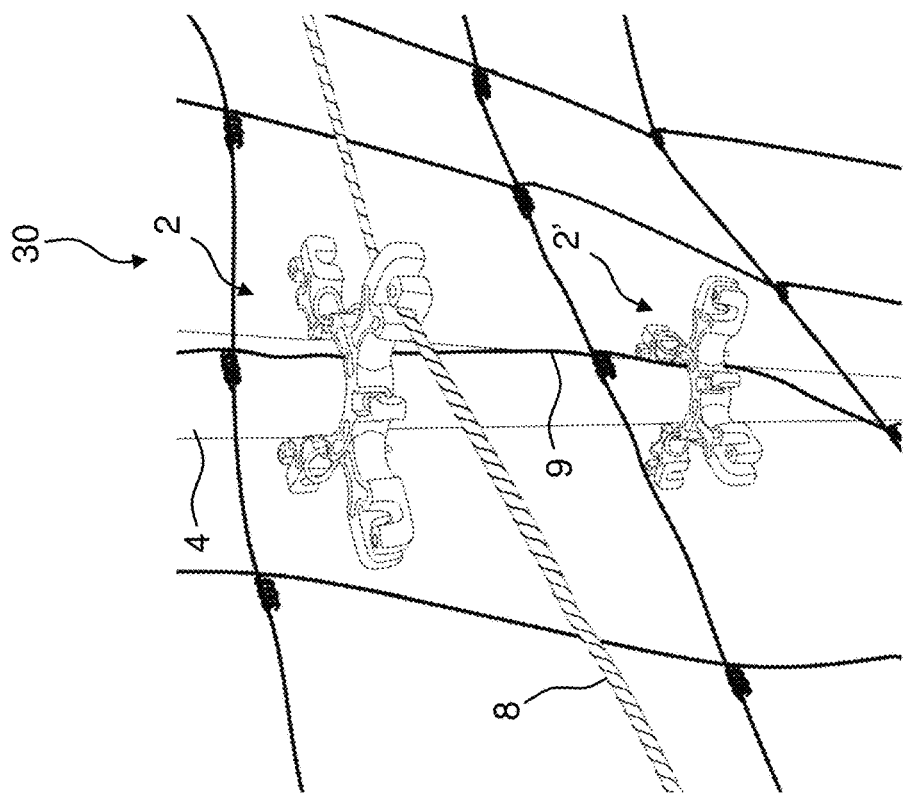
FIG. 6B shows a fence system according to the invention comprising a fixation member attached to a vertically extending ground-engaging post, wherein the system is used to fix a wire mesh to the post and an additional thread/wire to the post.
Figure 6A:
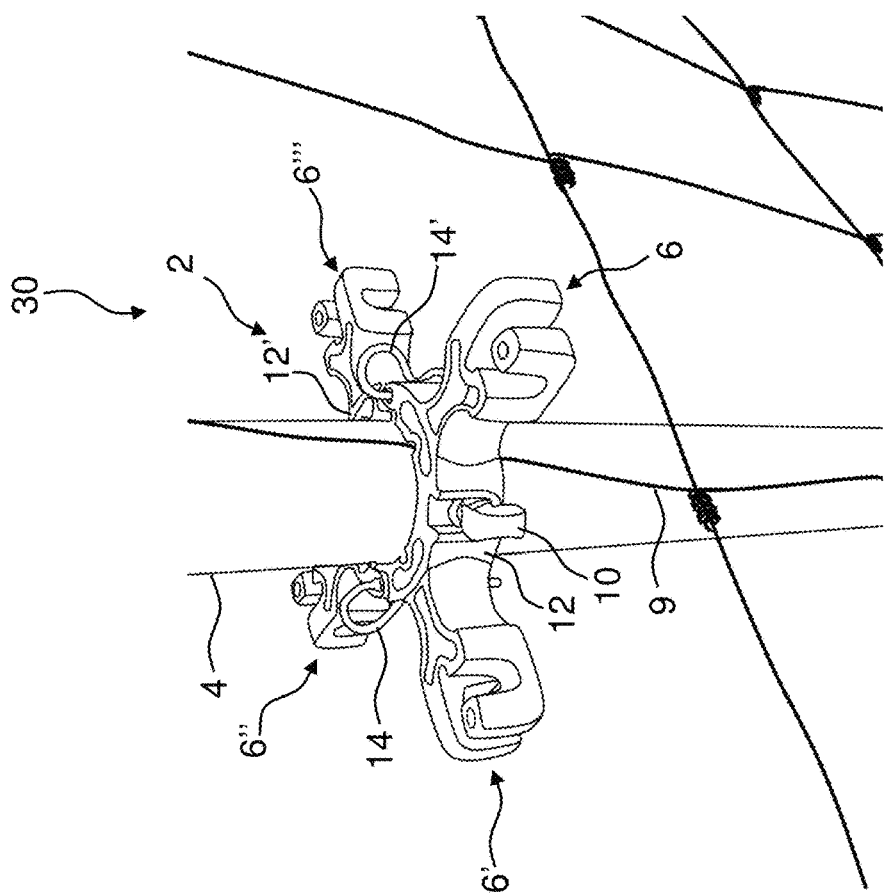
FIG. 6A shows a fence system according to the invention comprising a fixation member attached to a vertically extending ground-engaging post, wherein the system is used to fix a wire mesh to the post

FIG. 6A illustrates a fence system 30 according to the invention comprising a fixation member 2 attached to a vertically extending ground-engaging post 4. The fence system 30 is used to fix a wire mesh to a post 4. A thread/wire 9 of the wire mesh is received by an indentation.

The indentation (reference number 32 in FIG. 3A) can be seen in FIG. 3A. Both the indentation and the thread/wire 9 extend vertically.

The fixation member 2 corresponds to the one shown in FIG. 1A, FIG. 1B, FIG. 3A and FIG. 3B. The fixation member 2 comprises a first portion 12 and a second portion 12' detachably attached to each other by means of a first spring pin 14 and a second spring pin 14'. Thus, the first portion 12 and the second portion 12' are attached to each other in a first connection region and in a second connection region.

When one of the spring pins 14, 14' has been removed, the first portion 12 and a second portion 12' are rotatably attached to each other since the remaining spring pin 14, 14' functions as a part of a pivot joint 13. The pivot joint 13 is positioned in either the first connection region or the second connection region. Accordingly, the fixation member 2 can easily be attached to the post 4 and engage the vertically extending thread/wire 9 of the wire mesh. Thus, the wire mesh can be fixed to the post 4 by means of the fixation member 2 in a fast manner.

It is possible to use a single fixation member 2 to fix one or more additional electric fence threads/wires 8 to the post 4 as illustrated in FIG. 6A. The fixation member 2 comprises four attachment arms 6, 6', 6", 6''' that are evenly distributed along the periphery of the fixation member 2. The four attachment arms 6, 6', 6", 6''' are protruding radially from the base structure of the fixation member 2 and thus there is 90 degrees between any adjacent attachment arms 6, 6', 6", 6'''. A thumb screw 10 is used to fix the first portion 12 to the post 4. Likewise, a second thumb screw (not shown) is used to fix the second portion 12' to the post 4. The vertical position of the fixation member 2 can be adjusted by sliding the fixation member 2 up and down along the length of the post 4. When the desired vertical position is achieved, the thumb screws 10 are tightened in order to fix the fixation member 2 to the post 4.

FIG. 6B illustrates a fence system 30 according to the invention comprising a first fixation member 2 and a second fixation member 2' attached to a vertically extending ground-engaging post 4. The fence system 30 is used to fix a wire mesh and an additional electric fence thread/wire 8 to the post 4. A thread/wire 9 of the wire mesh is received by an indentation (reference number 32 in FIG. 3A) of the first fixation member 2 and the second fixation member 2'. Both the indentation and the thread/wire 9 extend vertically.

The first fixation member 2 is used to fix the additional electric fence thread/wire 8 to the post 4 by attaching the thread/wire 8 to one of the attachment arms 6 of the first fixation member 2. It is possible to attach additional electric fence threads/wires (not shown) to the first fixation member 2. The second fixation member 2' is also configured to receive one or more additional electric fence threads/wires (not shown).

The fence system 30 according to the invention can be assembled and disassembled in a fast manner. Therefore, the fence system 30 can be reused and applied in applications, in which fast assembling and disassembling is required. The fence system 30 is also suitable for use in permanent setups. If the posts are made of metal (e.g. galvanized steel) they may have a very long service time.

The fixation member 2 of the fence system 30 according to the invention can be assembled without using tools. This is a major advantage compared with the prior art systems that require tools during the assembling process. Furthermore, it is an advantage that the fixation member 2 of the fence system 30 according to the invention can be disassembled without using tools. Besides, when assembled, the configuration of fixation member 2 of the fence system 30 according to the invention can easily be adjusted (by changing the vertical position of the fixation member) in order to change the vertical position of one or more threads/wires attached to a post.

Figure 8B:
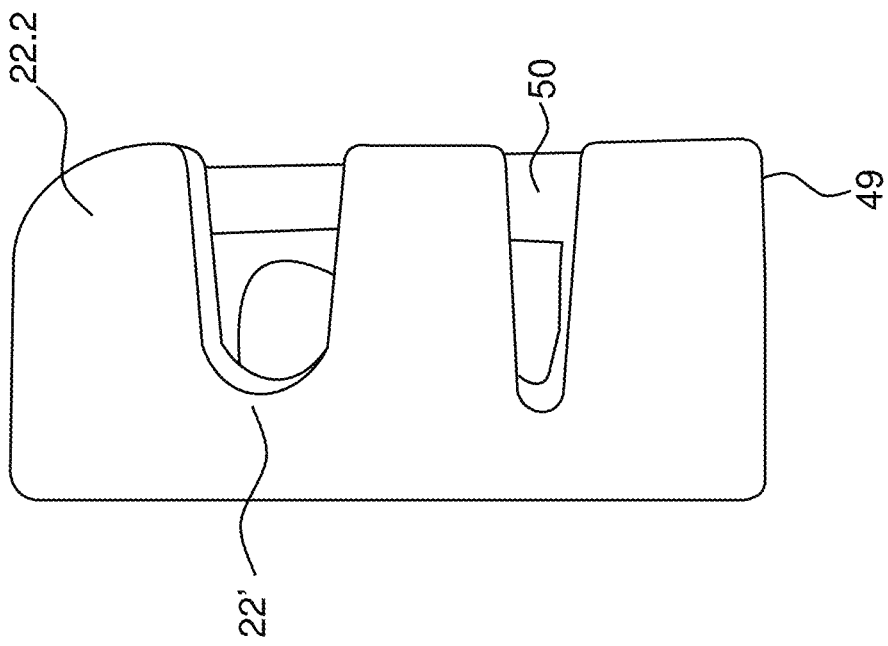
FIG. 8B shows the view of FIG. 8B but with the fixture structure turned to display the opposed side.
Figure 8A:
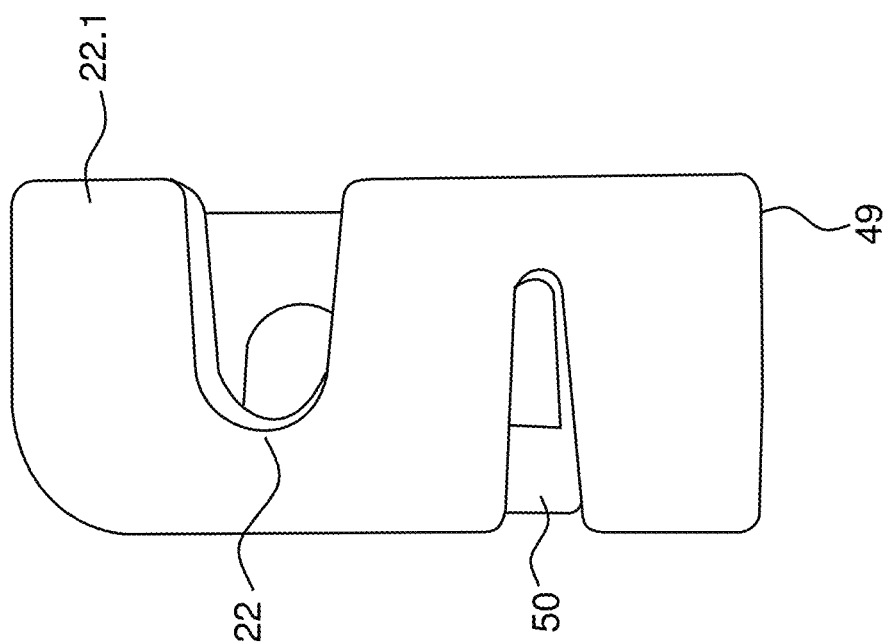
FIG. 8A shows a view of the fixture structure from one side.

The fixation structure 3 is here described in more detail with reference to FIG. 7A and FIG. 7B where fixation structure 3 is shown at a post from below and from above, and FIGS. 8A and 8B which disclose side views.

Figure 9B:
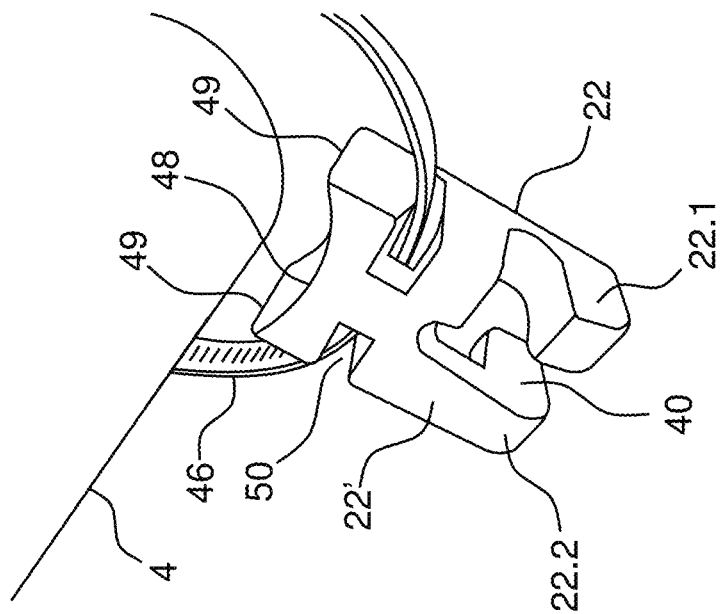
FIG. 9B shows a view of the fixture structure from above and with the pole and cable tie.
Figure 9A:
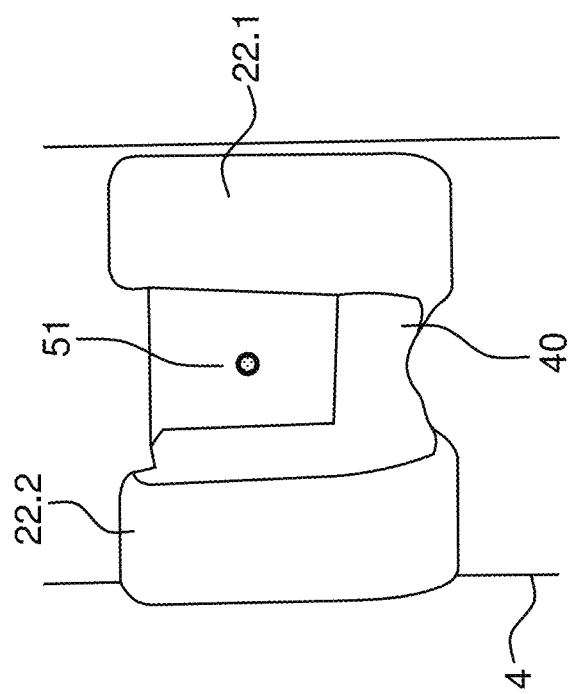
FIG. 9A shows a front view of the fixture structure placed on a pole.

In FIG. 9A the fixation structure 3 is disclosed in a front view, and a view from above is disclosed in FIG. 9B. Finally, FIG. 10 discloses the pole and the fixation structure 3 to reveal the radius size of the pole outer circumference and the cylindrical contact surface as described in more detail below.

The fixation structure 3 comprises two support structures 22, 22' being spaced from each other. The support structures 22, 22' are configured to receive a thread/wire 8 like the structures shown in FIG. 4A and in FIG. 3B so that the thread/wire 8 is releasably fixed thereto. The two support structures 22, 22' extend outwardly from the back side of the contact surface 48 and/or are spaced apart so that between them a gap 40 is provided which allows the back side of the contact surface to be accessed. One support structure 22 has a hooked shaped nose part 22.1 turned in one direction along the cylinder axis of the contact surface 48, whereas the other support structure 22' has a similarly shaped hooked nose part 22.2 but turned in the opposite axial direction. The hooked nose parts 22.1, 22.2 form the U-shaped receiving slot 44, 44' mentioned above. This allows a stretched-out thread or wire 9 to be introduced into the gap 40 when it extends in the direction of the cylindrical axis, and in the gap it may be rotated perpendicular to the thread axis in order to be gripped by the two hooked shaped nose parts 22.2, 22.1 and here remain fixed in the two receiving slots 44, 44'.

Figure 10:
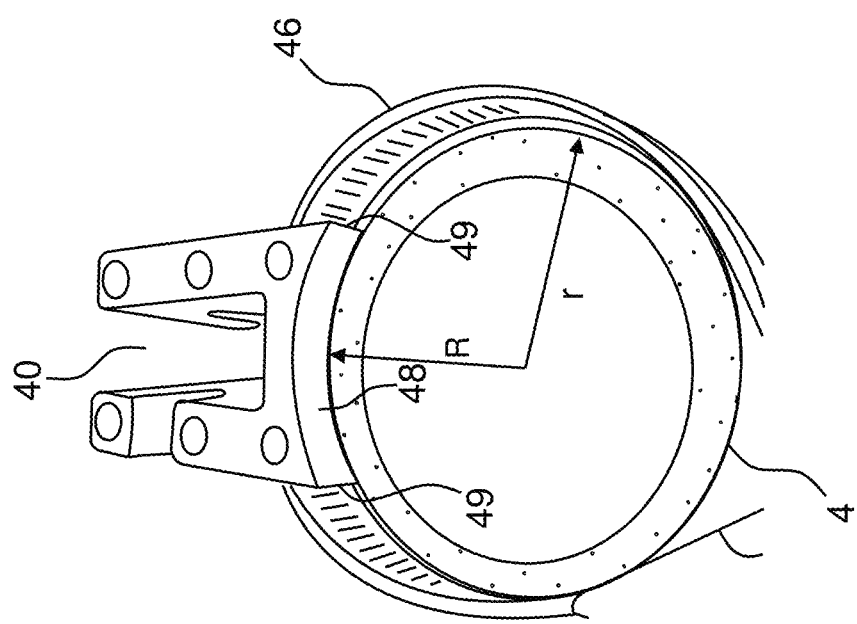
FIG. 10 is a view of the pole end with a fixture structure mounted at the end part of the pole.

The concave geometry of the contact surface 48 of the fixation structure 3 is made with a radius R, which preferably is smaller than the radius r of the post or pole 4 to which it is supposed to be attached. This is seen in FIG. 10. Hereby it is achieved, that at the two opposed edge parts 49 of the concave surface, a high pressure will be ensured between the pole outer surface and the edge parts of the concave surface. This helps in securing the fixation structure 3 against the pole as enhanced pressure against the edge parts 49 causes increased friction between the edge parts 49 and the pole at which it is secured. As seen the edge parts 49 run parallel to a cylindrical axis corresponding to the concave and cylindrically shaped contact surface 48.

The cable tie 46 shall be installed as seen in FIGS. 4B and 9A, in slots 50 which are provided between the back side of the contact surface and each of the support structures 22, 22'. When tightened to the pole 4, the cable tie 46 will ensure pressure between the pole and contact surface 48 especially at the edge parts 49 because, as shown in FIG. 10A, the slots 50 extend spaced from the contact surface along a straight line which runs tangentially to the cylindrical shape of the contact surface. This ensures that the forces of the cable tie 46 have a line of attack which is more in line with the desired pressure forces between the surface of the pole and the edge parts 49.

As indicated in FIG. 9A, the back side of the contact surface has an easily detectable indentation 51, which is useful in case the fixation structure 3 shall be fixed to a wooden pole using a regular screw. Here the screw may be placed with a pointed end in the indentation 51 and be screwed through the contact surface from the back side thereof and into a wooden pole. This allows for a very expedient mounting of the fixation structure to posts or poles made of wood or plastic. A through going hole (not shown in the drawings) from the back side of the contact surface in radial direction may be provided to accommodate bigger screws, in cases where the screw to be used shall be larger.

A further embodiment of a fixation element 36 attached to a vertically extending ground-engaging post 4, is disclosed in FIGS. 11-14.

Figure 14A:
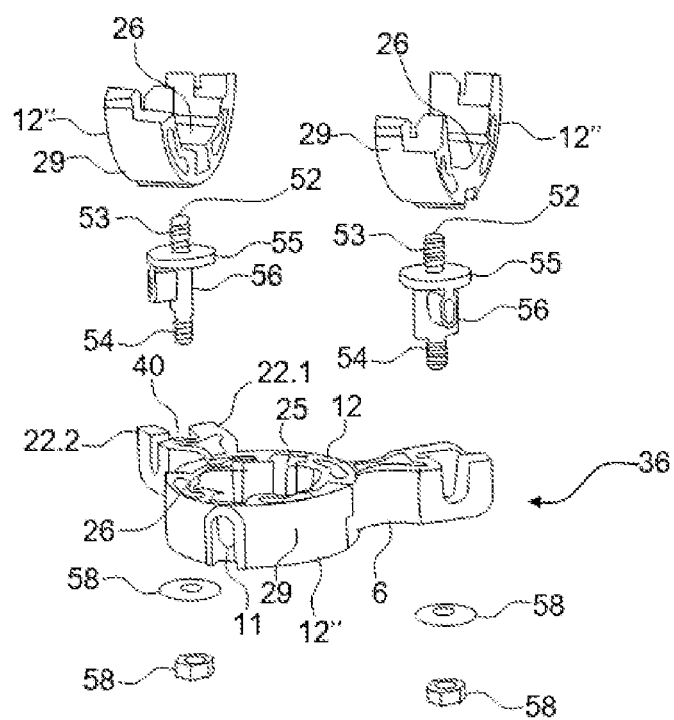
FIG. 14A shows a graphical 3D representation of the fixation element in exploded view.

In FIG. 14A, the exploded view shows the fixation element 36 on its own, and it can be seen, that it comprises a first portion 12 of a fixation member 2 attached to a counter portion 12", which counter portion 12" is almost identical to the first and second portions 12, 12' described above, however the counter portion 12" is lacking the attachment arms 6,6'. Thus, the counter portion 12" may attach to a further counter portion 12", a first portion 12 or a second portion 12' according to whatever is needed, using the pivot joint and spring pin connection provided in each of the ends of the first, second and counter portions.

Figure 11:
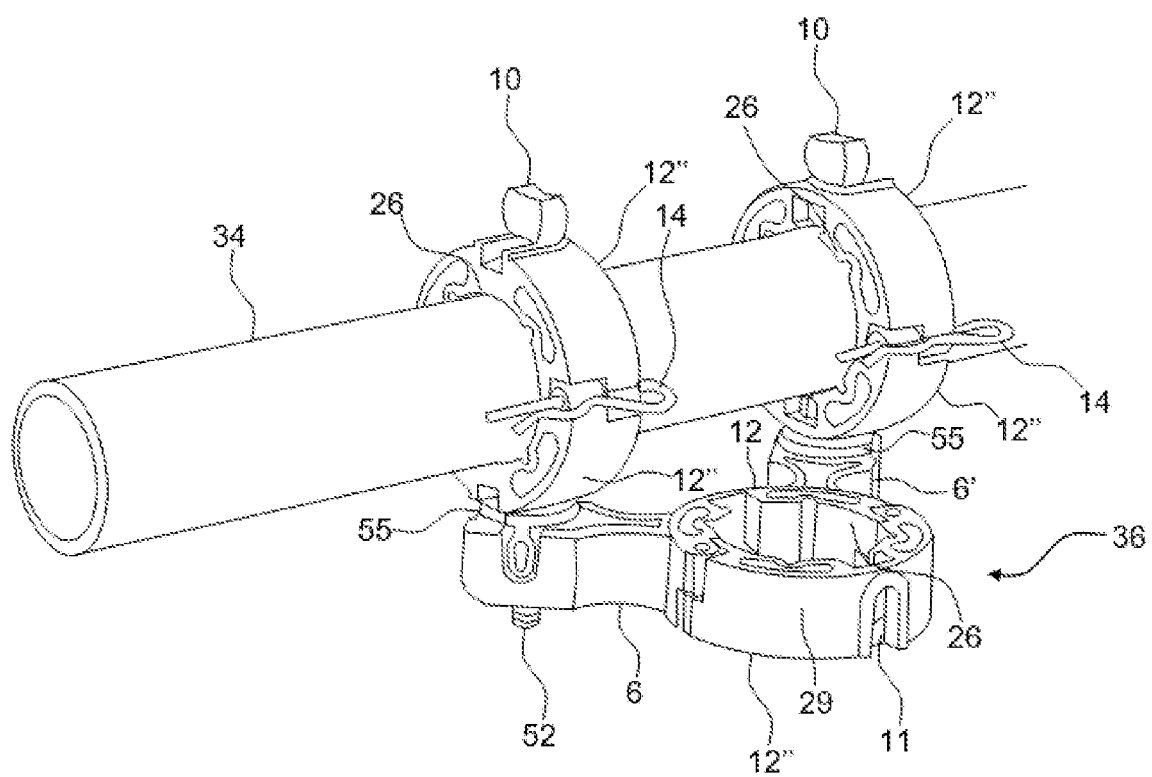
FIG. 11 shows a 3D graphical representation of a fixation element having a horizontal post attached thereto.
Figure 14B:
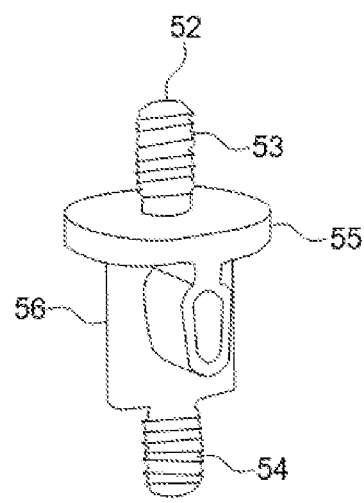
FIG. 14B is a close-up view of the bolt 52.
Figure 15A:
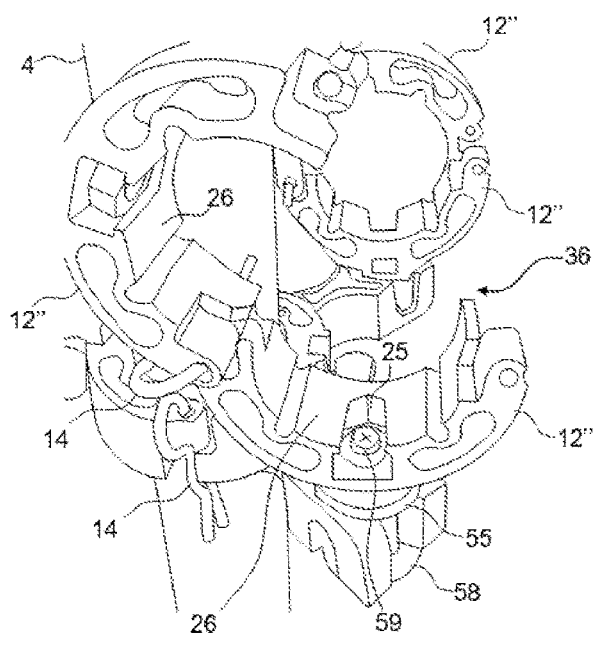
FIG. 15A is a close-up view (line drawing) with the round nut 59 visible in the recess 11 of counter portion 12" and FIG. 15B is a photo corresponding to the line drawing shown in FIG. 15A.
Figure 15B:
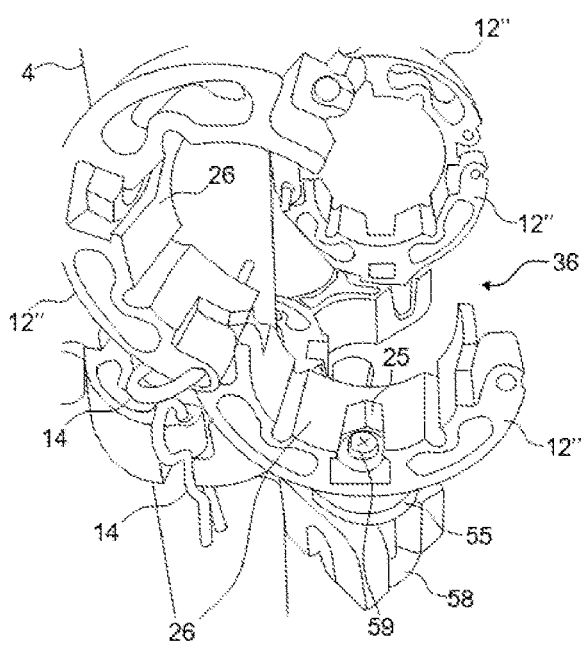

FIG. 11 shows how two counter portions 12" may be assembled around a pole, and in the figure two such assemblies are disclosed on the same pole. In FIG. 14B a bolt 52 is shown, which has threads 53, 54 in both an upper end and a lower end for the accommodation of tightening nuts. Below upper threads 53, a tightening plateau 55 is disclosed, and below the tightening plateau 55, a T-shaped fixture 56 is provided above a lower end threaded piece 54. The threaded parts 53, 54 are axially aligned, and the entire bolt 52 is a one-piece element made from plastic or light-metal. The T-shaped fixture 56 is made to exactly match the gap between two support structures 22, 22' where the base of the T-shaped element is shaped to be accommodated in the hook shaped nose part 22.1 of one of the two support structures 22, 22'.

Figure 13:
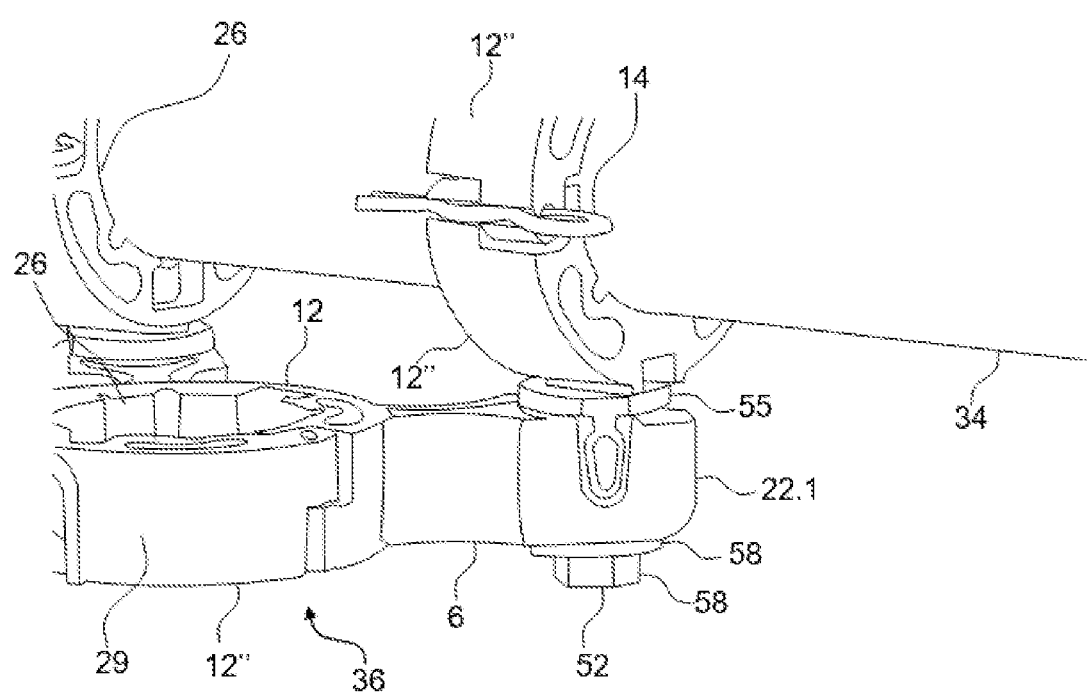
FIG. 13 is a close-up view of an element of the assembly shown in FIG. 11.

As seen in FIG. 13, the bolt 52 is thus mountable in the gap 40 between the support structures 22, 22' of an attachment arm 6, and a nut and washer 58 may be mounted to lower thread 54 in order to tighten the connection between the bolt and the support structures 22, 22'.

In FIG. 13 the nut and washer 58 are seen in an enlarged view, and it can be seen how the bolt 52 is mounted into the gap 40 and fastened to the support structures 22, 22'. Above the support structure, the tightening plateau 55 is loaded with a counter portion 12" such that the upper thread 52 of bolt 52 extends into the recess 11, where a round nut 59 and washer (not disclosed in figures) is provided for the counter portion 12" to be tightened towards the tightening plateau 55. The round nut 59 may be provided with a torque or other drive, such that the nut 59 may be tightened from the inside of the counter portion 12".

Figure 12:
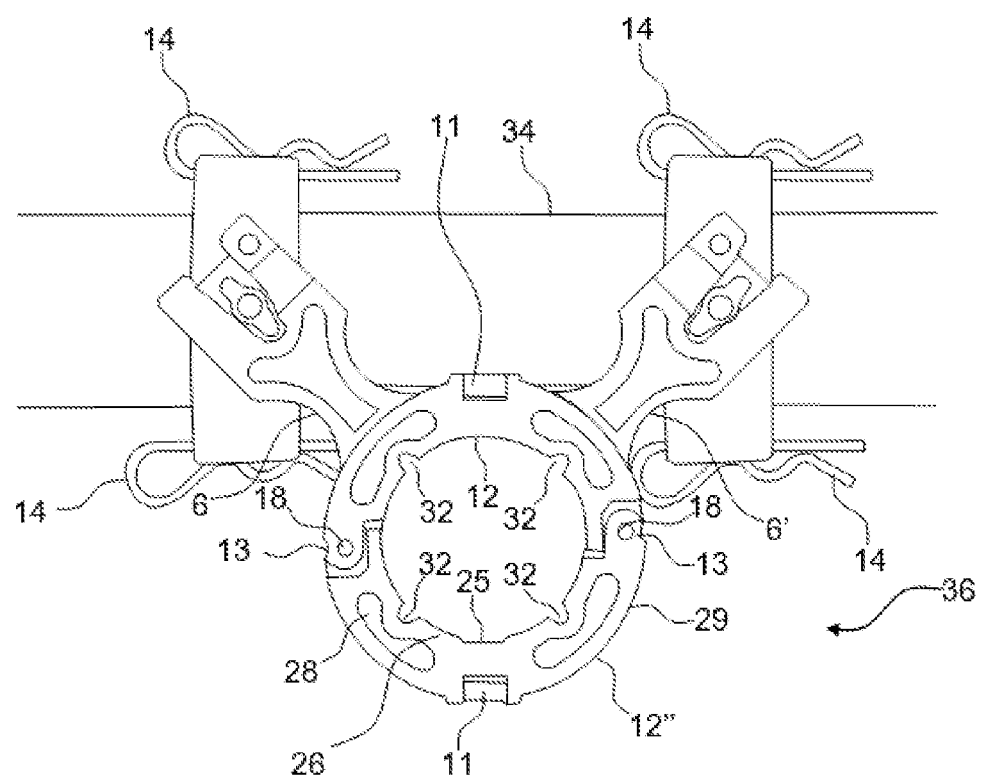
FIG. 12 is a 3D graphical representation of the assembly in FIG. 11, but seen from below.

As seen in FIGS. 11 and 12, two adjacent fixation structures 6, 6' are mounted with each of their counter portions 12" and to each of the mounted counter portion 12" a further identical counter portion 12" is attached by use of the hinge and hinge pin connection. In FIG. 12 the horizontal post 34 is disclosed, which is firmly attached to the fixation element 36 by the above described construction, and with reference to the figure, it may also be seen, that fixation structure 36 may be seated on a vertical pole 4 while a clearing remains between the two poles.

LIST OF REFERENCE NUMERALS 2, 2' Fixation member
3 Fixation structure
4 Post or pole
6, 6', 6", 6'" Attachment arm
8, 8', 8", 8'" Thread/wire/string (e.g. an electric conductor)
9 Thread/wire/string of a wire mesh
10 Screw
11 Screw recess
12 First portion
12' Second portion
12" Counter portion
13 Pivot joint
14, 14' Spring pin
16 Top member
18, 18' Hole
20 Base portion
22, 22' Support structure
22.1 Hooked nose part
22.2 Hooked nose part
24 Nut
25 Nut recess
26 Pole contact surface
28 Opening
29 Outer cylindrical surface
30 Fence system
32 Indentation
34 Post
36 Fixation element
38, 38' Thread
40 Gap
42 Base structure
44, 44' Receiving slot
46 Band member or "Cable tie"
48 Contact surface
49 Edge parts
50 Slots
R Radius of contact surface cylindrical shape
r Radius of circular pole or post outer surface
51 Indentation
52 Bolt
53 Upper thread
54 Lower thread
55 Tightening plateau
56 T-shaped fixture
58 Nut and washer
59 Round nut

What is claimed is:

1. A fence system for releasably fixing a thread to a post, said fence system comprising a fixation member having one or more fixation structures configured to receive the thread, thereby fixing the thread to the fixation member, wherein the fixation member comprises a first portion and a second portion detachably attached to each other at one or more pivot joints allowing the first portion and the second portion to rotate in-plane relative to one another, wherein the first portion and the second portion are identical, and wherein the fixation member comprises a basically cylindrical pole contact surface spanning at least 180 degrees.

2. The fence system according to claim 1, wherein the fixation member comprises a rotatably mounted fastening screw arranged to be radially displaced with respect to the cylindrical pole contact surface upon being rotated in order to engage a pole surface.

3. The fence system according to claim 2, wherein at the first portion and at the second portion the fastening screw is arranged at a midpoint between two fixation structures.

4. The fence system according to claim 2, further comprising a nut corresponding to the fastening screw in a nut recess of the first portion, the second portion and/or a counter portion and a corresponding screw recess in an outer cylindrical surface of the first portion, the second portion and/or the counter portion, wherein the nut recess and the screw recess open axially opposed to one another.

5. The fence system according to claim 1, wherein the fixation member comprises two, three or four radially extending attachment arms.

6. The fence system according to claim 5, wherein the attachment arms are evenly distributed along a periphery of the fixation member.

7. The fence system according to claim 6, wherein the cylindrical pole contact surface extends along a circular cylindrical surface that will form the pole contact surface when the fixation member is attached to a circular cylindrical pole.

8. The fence system according to claim 7, wherein the first and second portions further comprise an outer cylindrical surface spaced apart from the pole contact surface by one or more openings.

9. The fence system according to claim 8, wherein the fixation structures extend from the outer cylindrical surface.

10. The fence system according to claim 1, wherein the pole contact surface comprises at least one indentation extending axially.

11. The fence system according to claim 10, wherein the at least one indentation is aligned with one of the fixation structures.

12. The fence system according to claim 1, wherein the fence system comprises a plurality of posts and a plurality of threads.

13. The fence system according to claim 1, wherein the fence system comprises one or more additional fixation elements configured to be attached to the post, wherein said additional fixation elements are configured to receive and maintain an additional post.

14. The fence system according to claim 13, wherein the post and the additional post are substantially perpendicular to one another.

* * * * *